United States Patent [19]

Khoe

[11] Patent Number: 4,830,453
[45] Date of Patent: May 16, 1989

[54] DEVICE FOR OPTICALLY COUPLING A RADIATION SOURCE TO AN OPTICAL TRANSMISSION FIBER

[75] Inventor: Giok D. Khoe, Eindhoven, Netherlands

[73] Assignee: U.S. Philips Corp., New York, N.Y.

[21] Appl. No.: 73,884

[22] Filed: Jul. 10, 1987

Related U.S. Application Data

[63] Continuation of Ser. No. 797,558, Nov. 13, 1985, abandoned.

[30] Foreign Application Priority Data

Nov. 21, 1984 [NL]  Netherlands ........................ 8403535

[51] Int. Cl.$^4$ ................................................ G02B 6/32
[52] U.S. Cl. .............................. 350/96.18; 350/96.20
[58] Field of Search ............... 350/96.15, 96.17, 96.18, 350/96.20; 357/74, 75, 80, 81

[56] References Cited

U.S. PATENT DOCUMENTS

| | | | |
|---|---|---|---|
| 3,897,135 | 7/1975 | Dyott | 350/96.15 |
| 4,295,152 | 10/1981 | Khoe et al. | 357/74 |
| 4,296,143 | 10/1981 | Franken et al. | 350/96.15 X |
| 4,355,323 | 10/1982 | Kock | 357/74 |
| 4,431,261 | 2/1984 | Kozikowski | 350/96.20 |
| 4,625,333 | 11/1986 | Takazawa et al. | 350/96.20 X |
| 4,639,077 | 1/1987 | Dobler | 350/96.20 |

OTHER PUBLICATIONS

Keil et al., "Experimental Investigation of the Beam Spot Size Radius In . . . ", *Electronics Letters*, vol. 20, No. 15, Jul. 1984, pp. 621–622.

Furuya, K. et al., "Low-Loss Splicing of Single-Mode Fibers by Tapered-Butt-Joint Method," *Trans. IEEE Japan*, vol. E61, No. 12, pp. 957–961 (Dec. 1978).

Marcuse, D. "Loss Analysis of Single-Mode Fiber Splices", *Bell Sys. Tech. J*, vol. 56, No. 5, pp. 703–718 (May–Jun. 1977).

*Primary Examiner*—John D. Lee
*Attorney, Agent, or Firm*—William L. Botjer

[57] ABSTRACT

A device is described for optically coupling a radiation source unit to at least one optical monomode transmission fiber. The fiber core has a tapered end portion by which it can be connected to a known radiation source housing without very stringent requirements on the positional accuracy of the fiber relative to the optical components in the housing.

4 Claims, 1 Drawing Sheet

DEVICE FOR OPTICALLY COUPLING A RADIATION SOURCE TO AN OPTICAL TRANSMISSION FIBER

This is a continuation of application Ser. No. 797,558, filed Nov. 13, 1985 (abandoned).

BACKGROUND OF THE INVENTION

The invention relates to a device for optically coupling a radiation source unit to at least one optical transmission fiber. The device comprises a radiation source housing provided with a lens system and a transparent window whose outer side is connected to the transmission fiber.

Such a device is described in U.S. Pat. No. 4,355,323. In the known device the radiation emitting surface of a single radiation source, which may be a light emitting diode (LED) or a semiconductor laser, is imaged on the entrance aperture of a transmission fiber by a spherical lens. The lens is arranged on the inner side of the window. The transmission fiber is a multimode fiber in which a plurality of radiation modes can propagate simultaneously.

As is stated in an article by D. Marcuse entitled "Loss Analysis of Single-Mode Fiber Splices" (*The Bell System Technical Journal*, Vol. 56, No. 5, pages 703–718 (May–June 1977)), the radiation field of a monomode transmission fiber bears much resemblance to a Gaussian intensity distribution. Thus, a model spot may be assigned to such a fiber, which spot is characterized by a spot diameter 2W. W is the distance between the point of maximum intensity in the spot and the point where the intensity has decreased to $1/e_2$ of the maximum value.

The modal spot diameter 2W is the principal parameter in the case of coupling to a monomode transmission fiber. A light beam is almost wholly accepted by such a fiber only if the beam spot diameter is also 2W at the location of the end face of the fiber. For a monomode transmission fiber the modal spot diameter is on the order of the core diameter, and is, consequently, much smaller than the core diameter of a multimode transmission fiber. The principal coupling parameters for a multimode of fiber are the core diameter and the numerical aperture.

When a monomode transmission fiber is coupled to a radiation source, the source should be imaged as a very small radiation spot. This means that stringent requirements must be imposed on the optical path lengths between the radiation source and the end face of the fiber. Moreover, since the modal spot and the source spot are so small, these spots should be aligned very accurately relative to one another. Therefore, stringent requirements must be imposed on the alignment of the optical components, such as the radiation source, the lens system and the transmission fiber. A coupling device which meets such stringent requirements is very susceptible to temperature and external mechanical influences.

SUMMARY OF THE INVENTION

It is an object of the present invention to provide a device for coupling a radiation source to a monomode transmission fiber, in which the known radiation-source housing is employed and for which said alignment and optical path length requirements can be relaxed considerably. In the device according to the invention, the core of a monomode transmission fiber connected to the window has a tapered end portion.

In a monomode transmission fiber having a core with a tapered end portion, the confinement of the radiation to the core over the tapered portion is smaller than in a monomode fiber having a straight core. In the tapered fiber portion, only a part of the accepted radiation is propagated by the core. The remainder of the radiation propagates through the cladding. The effective modal spot diameter of such a fiber is therefore substantially larger than that of a monomode fiber having a straight end portion, so that the incident radiation spot may be substantially larger. Thus, the requirements imposed on the alignment and the optical path length may be relaxed considerably, while maintaining a high coupling efficiency.

It is to be noted that an article by K. Furuya et al entitled "Low-Loss Splicing of Single-Mode Fibers by Tapered-Butt-Joint Method" (*The Transactions of the IECE of Japan*, Vol. E-61, No. 12 pages 957–961 (December 1978)), describes giving a monomode transmission fiber a tapered end portion in order to increase the coupling efficiency. However, in the method described in this article, this step is employed for coupling two monomode transmission fibers to each other without an interposed lens system. Moreover, the tapered end portions are obtained after the fibers have been spliced to each other, namely by heating the splice and subsequently stretching it. In contrast according to the invention the fiber core is first tapered and subsequently the splice is made.

In a first embodiment of the device according to the invention, in which the radiation source unit is a single radiation source, the lens system comprises a single spherical lens arranged on the inner side of the transparent window.

In a second embodiment of the device according to the invention, the lens system comprises a plurality of lenses which are arranged side by side and which comprise rotationally symmetrical recesses in the inner surface of the window. Each recess contains a medium whose refractive index differs from that of the window material.

When a single radiation source is coupled to one monomode fiber, only that lens which is aligned relative to the radiation source and the fiber is employed.

U.S. Pat. No. 4,296,143 describes how an array of rotationally symmetrical lenses can be manufactured.

The inventive concept is particularly suitable for use in those cases in which a plurality of radiation sources are coupled to a plurality of monomode transmission fibers by means of such a lens array. The invention enables a coupling device to be realized which was almost impracticable until now.

In the coupling, the radiation source unit comprises a plurality of single radiation sources which are each associated with one lens. A corresponding number of monomode transmission fibers having tapered end portions are secured to the outer side of the window, each transmission fiber being associated with one radiation source and the associated lens in the window. Positioning the radiation-source unit, the lens system and the monomode fibers in such a way that the coupling efficiency is the same for all the fibers is very difficult if not impossible when monomode fibers are used. However, the positioning requirements can be relaxed considerably when monomode fibers having tapered end portions are used.

DESCRIPTION OF THE PREFERRED EMBODIMENTS

Figure 1:
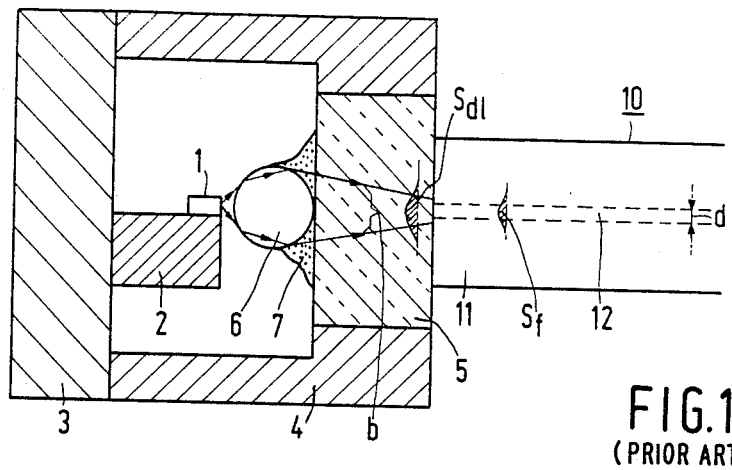
FIG. 1 schematically shows a known radiation source housing to which a transmission fiber having a straight end portion is coupled.

In FIG. 1, the reference numberal 1 denotes a radiation source in the form of a diode laser, which is mounted on a heat sink 2. This heat sink is supported by a mounting 3. A casing 4 having a transparent window 5 is secured to this mounting 3.

A radiation beam b emitted by the diode laser is received by a lens 6 and is focused on the outer side of the transparent window 5 to form a small radiation spot $S_{d1}$. The lens may be secured to the window 5 by means of an adhesive 7.

A monomode transmission fiber 10 having a cladding 11 and a core 12 is connected to the outer side of the window 5. This core 12 has a very small diameter d of, for example, 7/μm.

If, as is shown in FIG. 1, the transmission fiber has a straight end portion, the modal spot $S_f$ is small, in which case the radiation spot formed by the lens 6 must also be small. The beam b should then be focused very sharply. Moreover, the spots $S_{d1}$ and $S_f$ should then be aligned very accurately relative to one another.

Figure 2:
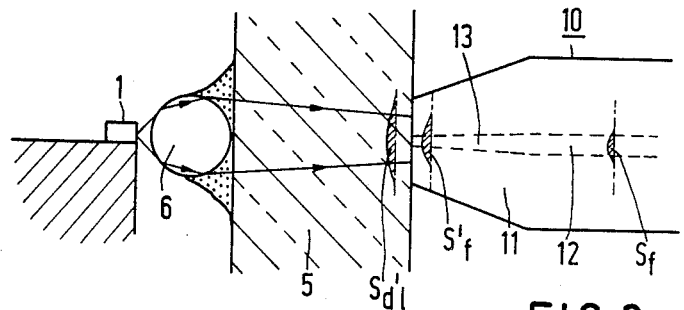
FIGS. 2, 3 and 4 schematically show embodiments of a coupling device according to the invention.

FIG. 2 shows schematically a first embodiment of a coupling device according to the invention. In this device the core of the monomode transmission fiber has a tapered end portion 13. A transmission fiber having a tapered core end portion can be formed by stretching a straight transmission fiber over a specific length. At the location of the narrowest constriction a scratch is made by means of a scribing tool. Subsequently, the fiber is stretched until it is fractured, the parting surface being flat at the location of the scratch. In this way two tapered transmission fibers having flat end faces are obtained.

As the end portion of the transmission fiber core is tapered, the confinement of the radiation to the core is reduced and more radiation is propagated by the cladding in the tapered end portion. The modal spot $S'_f$ is therefore larger than that ($S_f$) of a monomode transmission fiber having a straight core, so that the applied radiation spot $S'_{d1}$ may be larger. As a result of this, the center of the spot $S'_{d1}$ need no longer coincide with that of the spot $S'_f$ as accurately as in the device shown in FIG. 1. Further, it is possible to vary the optical path length between the lens and the end face of the fiber, (i.e. the thickness of the window 5) to a small extent. Preferably, the window is slightly thicker than that in FIG. 1, so that it is easier to make this window.

Alternatively, the lens may comprise a rotationally symmetrical recess in the inner surface of the window. As described in U.S. Pat. No. 4,296,143, such lenses can be manufactured by forming rotationally symmetrical recesses in a glass plate. These recesses are filled completely, by means of vapor deposition, with layers of glass or another transparent material having a refractive index which differs from that of the plate. Subsequently, the thickness of the plate is reduced to the original value or a smaller value.

Figure 3:
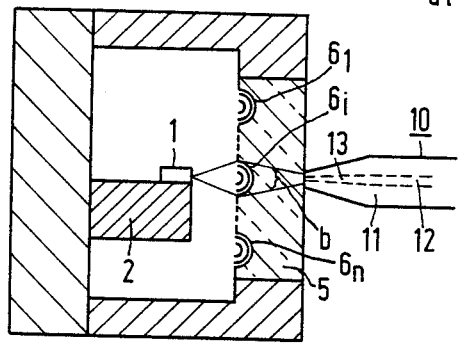

The lens plate thus formed may be used as a window in a coupling device as is shown in FIG. 3, in which one of the lenses, $6_i$, is aligned with the radiation source 1.

Figure 4:
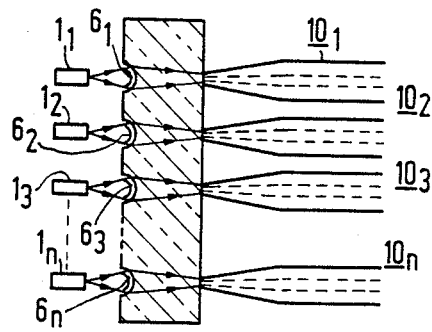

It is also advantageous to employ the lens plate when a plurality of radiation sources are coupled simultaneously to a plurality of monomode transmission fibers, as is illustrated in FIG. 4. The radiation source unit comprises, for example, a linear array of diode lasers $1_1$, $1_2$...$1_n$, which may be integrated on one substrate. The radiation from each of the diode lasers is received by a separate lens $6_1$, $6_2$...$6_n$ and is focused on the input face of one of the monomode transmission fibers $10_1$, $10_2$...$10_n$.

Each of these fibers has a core with a tapered end portion, so that the coupling device is simpler to manufacture.

It is essential for the invention that the core of the monomode transmission fiber is tapered. In practice the cladding 11 will also become tapered when the core 12 is tapered, as is indicated in FIGS. 2, 3 and 4.

Apart from diode lasers, light emitting diodes may be used as radiation sources.

What is claimed is:

1. A device for optically coupling a radiation source to an optical transmission fiber, said device comprising:
    a housing having a transparent window, said window having a flat outer surface;
    a radiation source arranged in the housing to emit radiation though the window;
    a lens system disposed within the housing, the radiation emitted by said radiation source impinging on said lens system; and
    a monomode optical transmission fiber having a core and a cladding, an end portion of said transmission fiber being tapered and having a flat end face, the flat core end face being fixed to the flat outer surface of the window, said end portion producing a fiber modal spot size substantially larger than the modal spot size of the untapered portion of said transmission fiber, and said lens system concentrating the radiation of said source into a spot which corresponds to the enlarged modal spot size.

2. A device as claimed in claim 1, characterized in that:
    the radiaion source is a single radiation source; and
    the device further comprises a single spherical lens arranged on an inner side of the window to receive radiation from the source.

3. A device as claimed in claim 1, characterized in that:
    the window has a refractive index; and
    the device further comprises a plurality of lenses arranged in rotationally symmetric recesses in an inner side of the window, each lens having a refractive index different from the refractive index of the window.

4. A device as claimed in claim 3, wherein said device further comprises:
    a plurality of radiation sources arranged in the housing, each source being associated with one lens to emit radiation through the associated lens; and
    a plurality of monomode optical transmission fibers, each fiber having a core with a surrounding cladding, said end portion of each transmission fiber being tapered and having a flat end face, each flat core end face being fixed to the flat outer surface of the window, each fiber being associated with one lens in the window to receive radiation passing through the associated lens, whereby radiation incident to said flat end face propagates through said core and surrounding cladding, increasing the modal spot size of said transmission fibers.

* * * * *